(12) United States Patent
Yi

(10) Patent No.: US 7,304,713 B2
(45) Date of Patent: Dec. 4, 2007

(54) LIQUID CRYSTAL DISPLAY PANEL WITH MARKS FOR CHECKING CUTTING PRECISION BY VISUAL INSPECTION

(75) Inventor: Hung Meng Yi, Tao Yuan Shien (TW)

(73) Assignee: Quanta Display Inc., Kuei Shan Hsiang, Tao Yuan Shien (TW)

( * ) Notice: Subject to any disclaimer, the term of this patent is extended or adjusted under 35 U.S.C. 154(b) by 350 days.

(21) Appl. No.: 10/828,296

(22) Filed: Aug. 27, 2004

(65) Prior Publication Data

US 2005/0225710 A1    Oct. 13, 2005

(30) Foreign Application Priority Data

Apr. 13, 2004    (TW) ................. 93110296 A

(51) Int. Cl.
*G02F 1/1333*    (2006.01)
*G02F 1/13*    (2006.01)
*H01L 21/00*    (2006.01)
*H01L 21/76*    (2006.01)

(52) U.S. Cl. ................. 349/158; 349/187; 438/462; 438/401

(58) Field of Classification Search ................. 349/73; 438/462

See application file for complete search history.

(56) References Cited

U.S. PATENT DOCUMENTS 6,982,793 B1 * 1/2006 Yang et al. ................. 356/401
2004/0032031 A1 * 2/2004 Holscher et al. ............ 257/797
2004/0263768 A1 * 12/2004 Lee et al. .................... 349/158

FOREIGN PATENT DOCUMENTS

JP    05346562 A  * 12/1993
JP    2001013485 A  * 1/2001

* cited by examiner

*Primary Examiner*—Andrew Schechter
*Assistant Examiner*—W. Patty Chen
(74) *Attorney, Agent, or Firm*—Harold L. Novik; Stanley N. Protigal; The Nath Law Group

(57) ABSTRACT

A liquid crystal display (LCD) panel with marks for checking cutting precision by visual inspection is provided. A checkerboard mark is formed on an intersection of two adjacent cutting lines of the LCD panel. The checkerboard mark includes a pair of first-square marks in a diagonal relationship and a pair of second-square marks in a diagonal relationship. When completing cutting of the LCD panel, the cutting precision of the LCD panel can be checked by visually inspecting the distance between the square mark and the cutting line or the residue of the checkerboard mark. The checkerboard mark is suitable for various LCD panels' arrangement.

18 Claims, 16 Drawing Sheets

LIQUID CRYSTAL DISPLAY PANEL WITH MARKS FOR CHECKING CUTTING PRECISION BY VISUAL INSPECTION

BACKGROUND OF THE INVENTION

1. Field of the Invention

The present invention relates to a liquid crystal display panel, and more particularly to a liquid crystal display panel with marks for checking cutting precision by visual inspection.

2. Description of the Prior Art

Since liquid crystal display devices provide advantages of low power consumption and easily carrying etc., the liquid crystal display devices are increasingly popular. The liquid crystal display device generally includes two components of a liquid crystal display panel and a backlight module. The liquid crystal display panel mainly includes a bottom substrate, a top substrate and a liquid crystal material filled between the bottom substrate and the top substrate. The bottom substrate has a plurality of thin film transistors formed thereon, which is called "array substrate" hereinafter, and the top substrate has a color filter plate formed thereon, which is called "color filter substrate" hereinafter. The liquid crystal display panel utilizes the properties of optical anisotropy and polarization of the liquid crystal material to display images. Due to the high resolution and the superiority of displaying dynamic images of the active matrix liquid crystal display panel, it becomes one of the most popular products.

A plurality of gate lines for receiving scanning signals and a plurality of data lines for receiving data signals are formed on the array substrate to define a plurality of pixel areas. A pixel electrode connected to one of the thin film transistors is formed on each of the pixel areas to apply a voltage to the liquid crystal material. The color filter plate of the color filter substrate corresponds to the pixel areas. The color filter plate includes a plurality of red, green and blue sub-filters. A black matrix is formed on the color filter plate to interrupt the light outside the region of the pixel electrodes to prevent the light from illuminating on the thin film transistors. The color filter substrate further includes a common electrode for applying the voltage to the liquid crystal material.

The common electrode and the pixel electrodes are respectively formed on the opposite inner surfaces of the color filter substrate and the array substrate. The liquid crystal material is filled between a space contained between the opposite inner surfaces of the color filter substrate and the array substrate. A polarizing film is respectively formed on the outer surfaces of the color filter substrate and the array substrate to complete the manufacture of the liquid crystal cells. The light transmissibility of the liquid crystal cells is controlled by the voltage applied on the common electrode and the pixel electrodes. Hence, the images can be displayed by a light-shutter effect.

FIG. 1 is a schematic cross-sectional view of an electronic device 1 having a capability of displaying. The electronic device 1 is disposed in a housing 2 and provided with a liquid crystal display device for displaying. For simplicity of the drawing, only the major components of the liquid crystal display device including a backlight light source and a liquid crystal display panel are shown in the drawing of FIG. 1. The liquid crystal display panel includes two transparent substrates 3 and 4 and a pair of sealing elements 5 and a liquid crystal material 6 filled between the two transparent substrates 3 and 4. The backlight light source is disposed under the liquid crystal display panel. The backlight light source comprises a backlight plate 2 and a lamp 8. The liquid crystal display panel is disposed on a printed circuit board 9, and the backlight light source is disposed under the printed circuit board 9. The printed circuit board 9 has an opening 10 for the light of the backlight light source passing through to enter the liquid crystal display panel. The housing 2 has an opening 11 corresponds to a display area of the liquid crystal display panel.

One of the key steps for assembling the components of the electronic device 1 is the mechanical alignment for assembling the liquid crystal display device in the housing 2. When the accuracy of the mechanical alignment for assembling the liquid crystal display device in the housing 2 can not be attained, the liquid crystal display device would be easily detached from the housing 2. In order to attain the accuracy of the mechanical alignment for assembling the liquid crystal display device in the housing 2, generally a mark is formed on an intersection of each pair of adjacent cutting lines of the liquid crystal display panel in order to check cutting precision of the liquid crystal display panel after completing the cutting of the liquid crystal display panel. FIG. 2 is a schematic plane view of a liquid crystal display panel before cutting, a liquid crystal display panel 21 is previously formed on a large substrate 20. A cutting line 22 is formed on each boundary of the liquid crystal display panel 21, and a cross mark 23 is formed on the intersection of each pair of the adjacent cutting lines 22. FIG. 2A is a partial enlarged view of FIG. 2, after completing the cutting of the liquid crystal display panel 21, the cutting precision of the liquid crystal display panel 21 is checked by measuring distances $d_1$ and $d_2$ between the cutting lines 22 and the cross mark 23. The measurement of the distances $d_1$ and $d_2$ take time. Thus, it takes longer time to check the cutting precision of the liquid crystal display panel 21 employing the cross mark 23. In order to save the measuring time, another mark whose dimensions are as same as the cutting precision is provided. FIG. 2B is another partial enlarged view of the liquid crystal display panel 21, a square mark 24 whose dimensions are as same as the cutting precision is formed on the intersection of the two adjacent cutting lines 22. After completing the cutting of the liquid crystal display panel 21, the cutting precision of the liquid crystal display panel 21 can be checked by visually inspecting distances $d_3$ and $d_4$ between the cutting lines 22 and the square mark 24 or the residue of the square mark 24. When visually inspecting the cutting liquid crystal display panel 21, and find out the distances $d_3$ and $d_4$ are smaller than the dimensions of the square mark 24 or the residue of the square mark 24 is left on the liquid crystal display panel 21, the cutting precision of the liquid crystal display panel 21 is permitted. FIG. 3A is a partial enlarged view of the liquid crystal display panel 21 on which a pattern is formed on the intersection of the adjacent cutting lines 22. Since the pattern 25 covers the square mark 24, the cutting precision of the cut liquid crystal display panel 21 can not be checked. The designing of the square mark 24 is not suitable for the liquid crystal display panel 21 having the pattern on the intersection of the adjacent cutting lines 22. FIG. 3B is a schematic partial plane view of the liquid crystal display panels 21 adjacent to each other and together disposed on a larger substrate. After completing the cutting of the liquid crystal display panels 21a and 21b, whether the distances $d_3$ and $d_4$ between the cutting lines 22 of the liquid crystal display panel 21a and the square mark 24 are larger than the dimensions of the square mark 24 or not can be visually checked. However, it is unreliable to check the cutting precision of the liquid crystal display panel 21b, which is adjacent to the liquid crystal display panel 21a, by visually inspecting the distance $d_5$ between the cutting line 22 of the liquid crystal display panel 21b and the square mark 24. Hence, the designing of the square mark 24 is not suitable for the liquid crystal display panels disposed on the larger substrate adjacent to each other.

Accordingly, it is an intention to provide a mark suitable for various arrangements of the liquid crystal display panels on the large substrate.

SUMMARY OF THE INVENTION

It is one objective of the present invention to provide a liquid crystal display panel with marks for checking cutting precision by visual inspection, which provides a checkerboard mark on an intersection of two adjacent cutting lines of the panel for visually inspecting the cutting precision of the panel so as to shorten the manufacturing time of the liquid crystal display panel.

It is another objective of the present invention to provide a liquid crystal display panel with marks for checking cutting precision by visual inspection, which is suitable for conditions of the intersection of two adjacent cutting lines having a pattern or without a pattern, the panels disposed distant from each other, and the panels disposed adjacent to each other.

In order to achieve the above objectives of this invention, in one aspect of the present invention, the present invention provides an array substrate of a liquid crystal display panel, which includes a transparent substrate, a plurality of array units and a plurality of checkerboard marks. The array units are formed on the transparent substrate and each of the array units corresponds to a display area. Each boundary of the array unit has a cutting line and each pair of the adjacent cutting lines intersect with each other to enclose the array unit. The checkerboard mark is formed on the intersection of each pair of the adjacent cutting lines. The checkerboard mark has a pair of first-square mark in a diagonal relationship and a pair of second-square mark in a diagonal relationship.

In another aspect of the present invention, the present invention provides a color filter substrate of a liquid crystal display panel, which includes a transparent substrate, a plurality of color filter units and a plurality of checkerboard marks. The color filter units are formed on the transparent substrate. Each of the color filter units corresponds to a display area. Each boundary of the color filter unit has a cutting line and each pair of the adjacent cutting lines intersect with each other to enclose the color filter unit. The checkerboard mark is formed on the intersection of each pair of the adjacent cutting lines, and the checkerboard mark has a pair of first-square mark in a diagonal relationship and a pair of second-square mark in a diagonal relationship.

By the designing of the checkerboard marks, after completing cutting of the panels, the cutting precision of each panel can be checked by directly visual inspecting the distance between the cutting line of the panel and the checkerboard mark or the residue of checkerboard mark. As a consequence, the manufacturing time of the liquid crystal display panel can be reduced. The designing of the checkerboard marks is suitable for the conditions of the intersection of two adjacent cutting lines having a pattern or without a pattern, the panels disposed distant from each other, or the panels disposed adjacent with each other.

BRIEF DESCRIPTION OF THE DRAWINGS

The objectives and features of the present invention as well as advantages thereof will become apparent from the following detailed description, considered in conjunction with the accompanying drawings.

DESCRIPTION OF THE EMBODIMENTS

Figure 1:
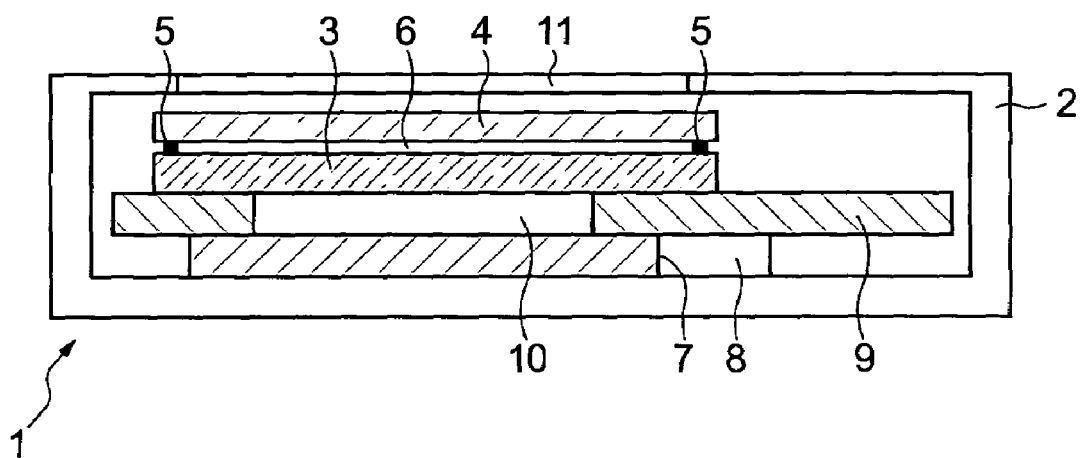
FIG. 1 is a schematic cross-sectional view of a conventional electronic device having a capability of displaying.
Figure 2:
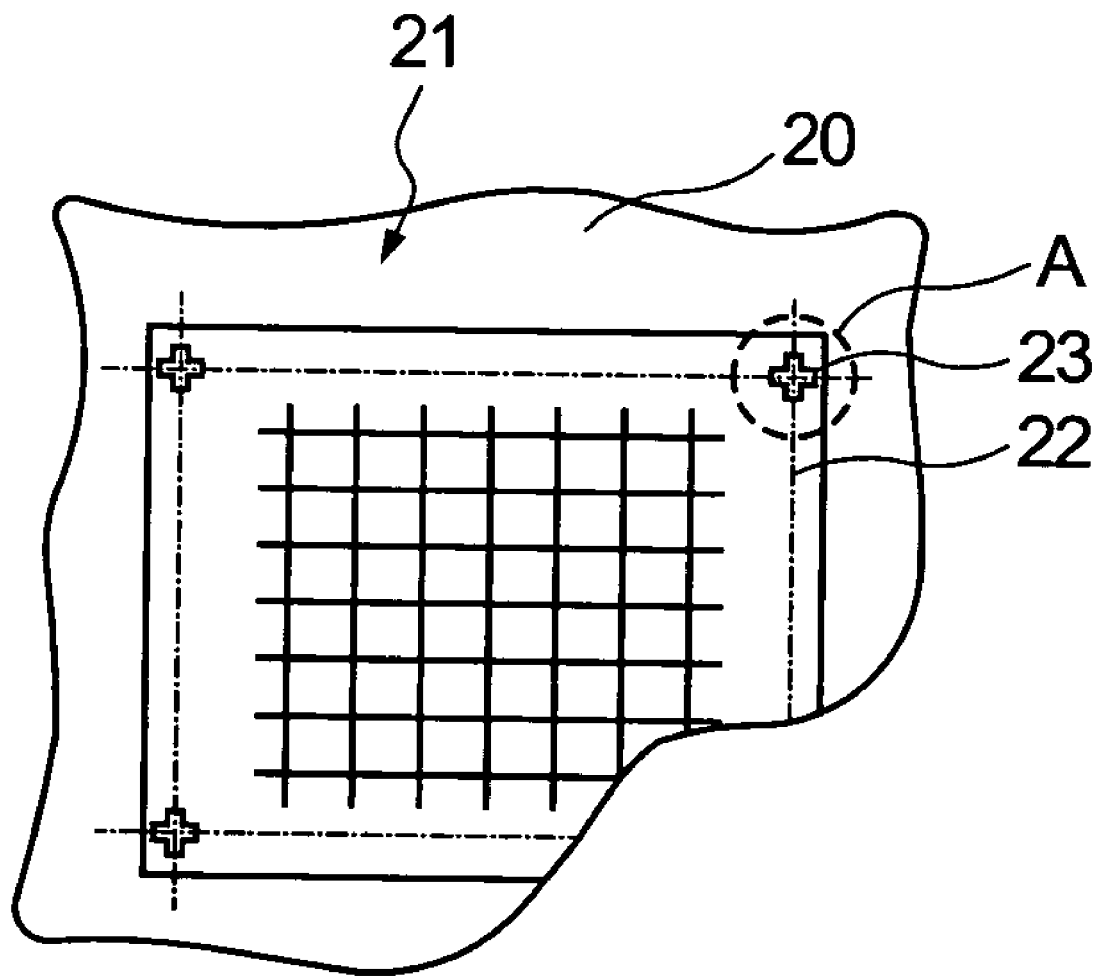
FIG. 2 is a schematic partial plane view of a large substrate having a liquid crystal display panel formed thereon.
Figure 2A:
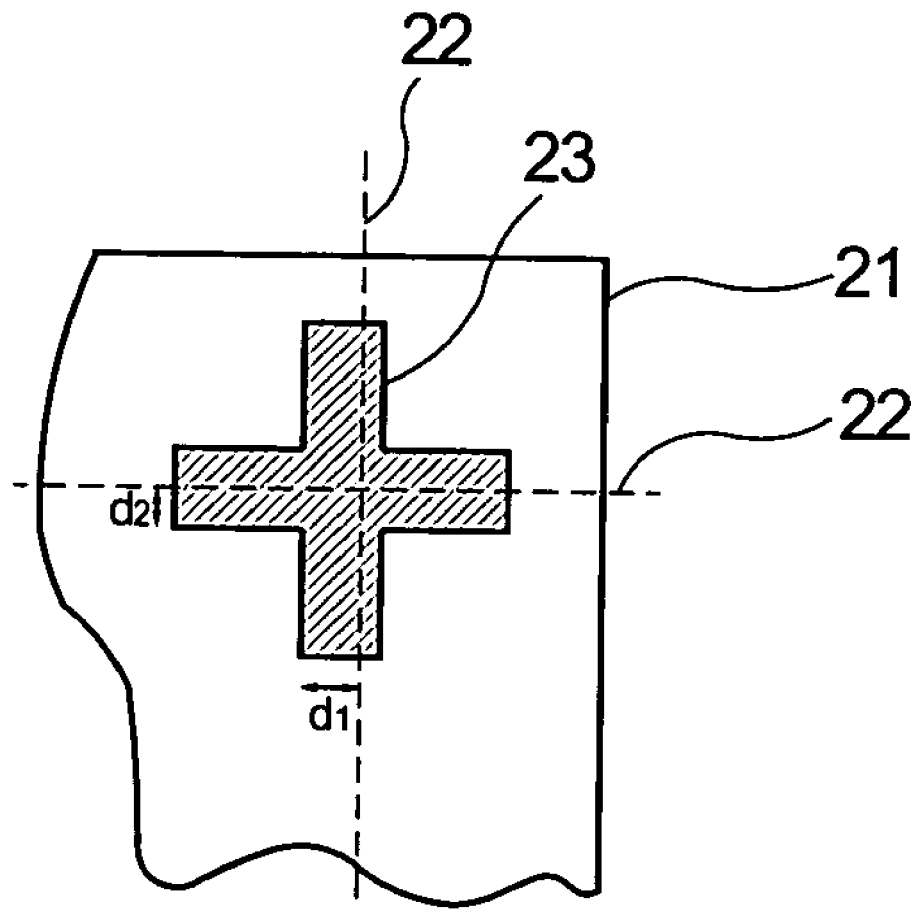
FIG. 2A is an enlarged partial plane view of FIG. 2.
Figure 2B:
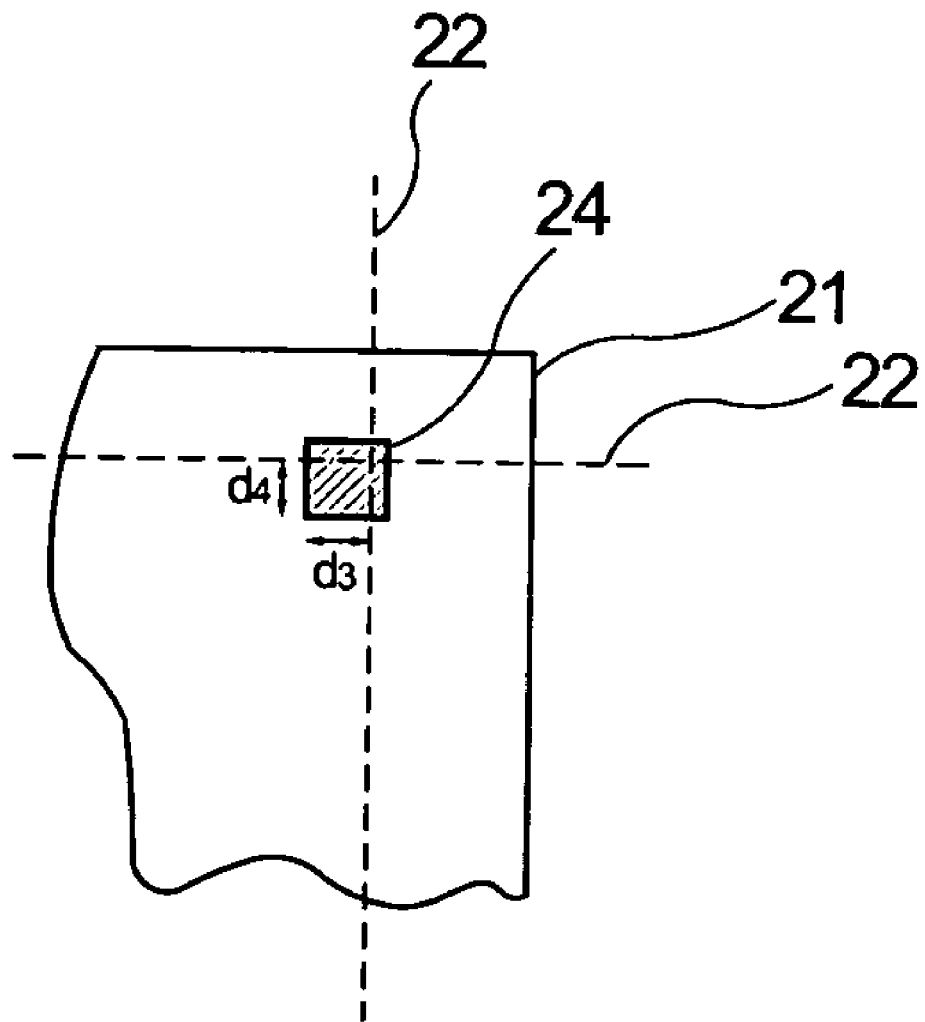
FIG. 2B is an enlarged partial plane view of a liquid crystal display panel having a square mark formed thereon.
Figure 3A:
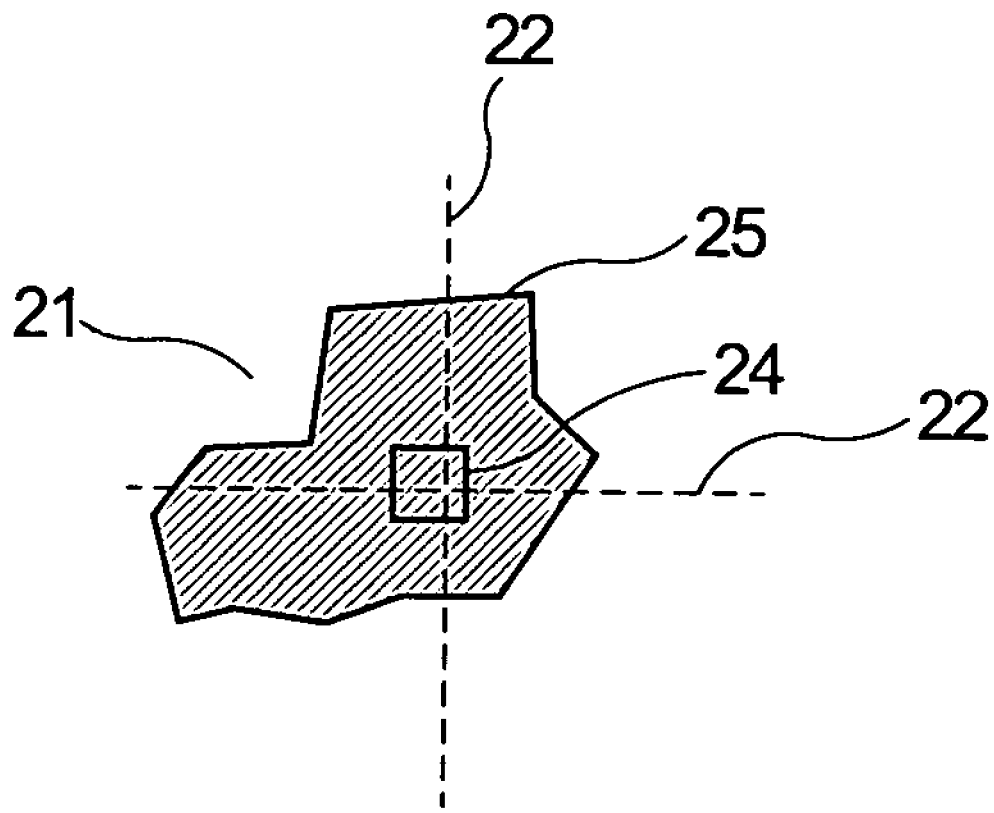
FIG. 3A is an enlarged partial plane view of a liquid crystal display panel having a square mark and a pattern formed on an intersection of two adjacent cutting lines.
Figure 3B:
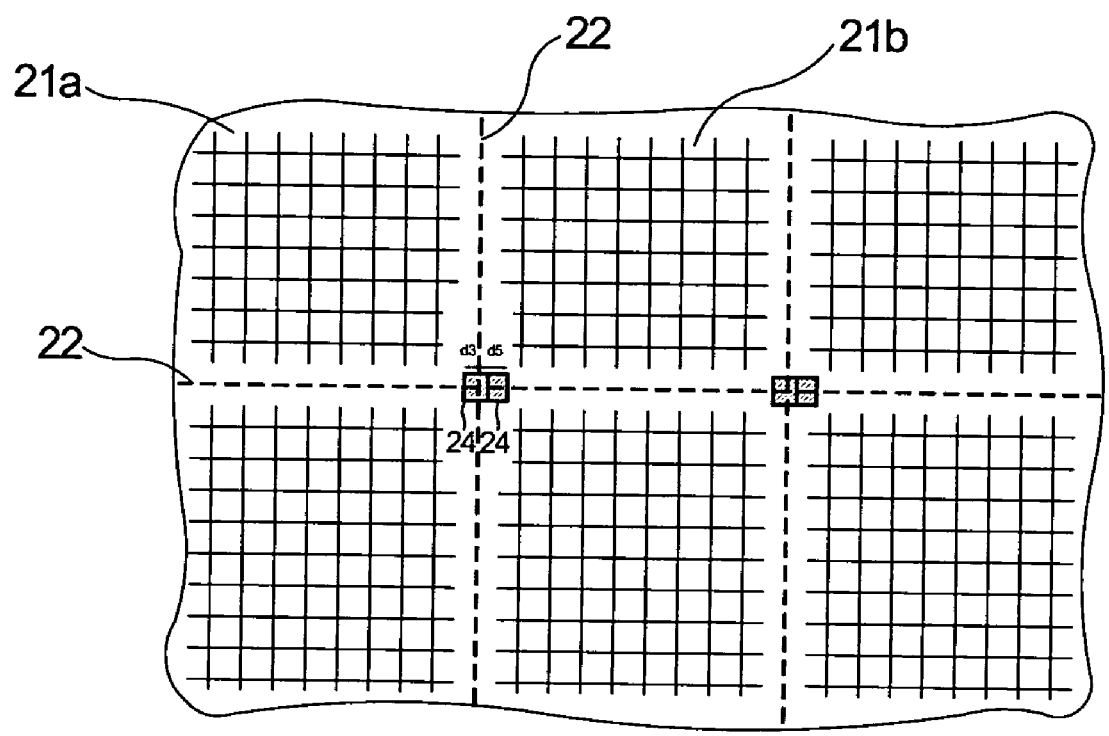
FIG. 3B is a schematic partial plane view of a large substrate having liquid crystal display panels adjacent to each other disposed thereon.
Figure 4:
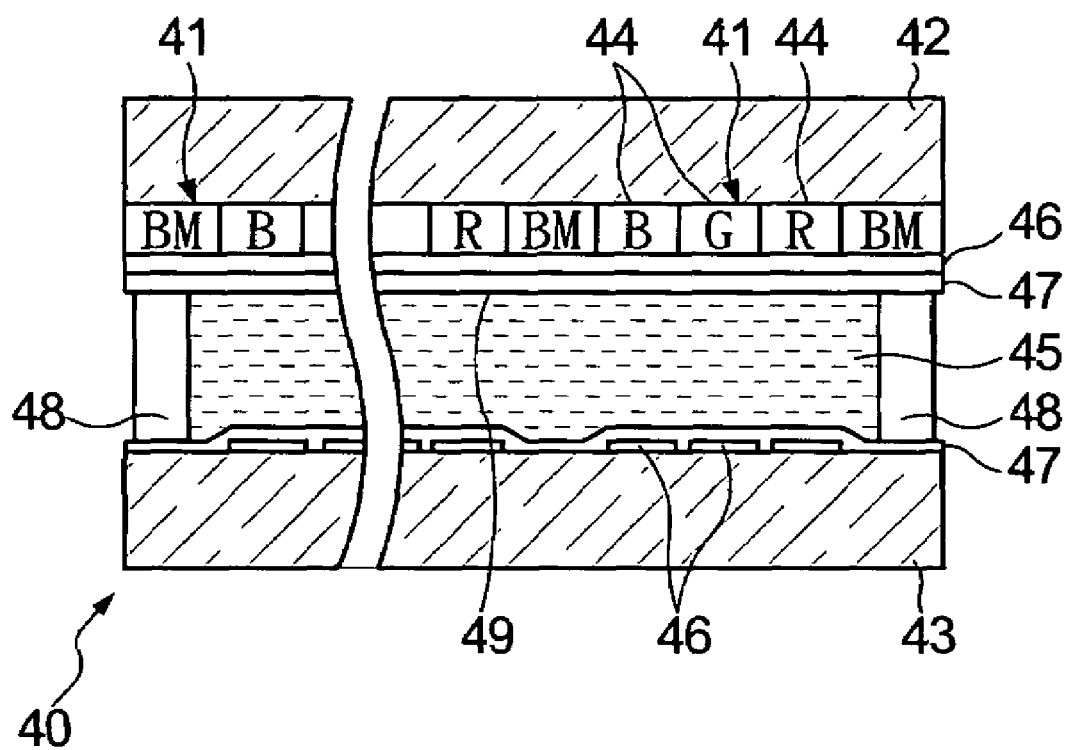
FIG. 4 is a schematic cross-sectional view of the liquid crystal display panel.

Before describing the liquid crystal display panel with marks for checking cutting precision by visual inspection provided by the present invention, the structure of the liquid crystal display panel is briefly described as follows. FIG. 4 is a simplified cross-sectional view of a liquid crystal display panel 40. The liquid crystal display panel 40 has a plurality of pixels 41 in a matrix pattern formed between a pair of transparent substrates 42 and 43. The transparent substrate 42 is generally called "color filter substrate". One red, green and blue sub-filter 44 are formed on the inner surface of the transparent substrate 42, and corresponding to one of the pixels 41. The transparent substrate 43 is generally called "array substrate", a plurality of thin film transistors (not shown) are formed on the inner surface of the transparent substrate 43, and corresponding to one of the pixels 41. A liquid crystal material 45 for generating the pixels 41 is sealed between the transparent substrates 42 and 43. A plurality of transparent electrodes 46 are formed on the inner surfaces of the transparent substrates 42 and 43 for generating an electric field on the liquid crystal material 45. Besides, an alignment film 47 for aligning the liquid crystal material 45 of the pixels 41 is respectively formed on the inner surfaces of the transparent substrates 42 and 43, and covering the transparent electrodes 46. The transparent substrate 42 is stacked over the transparent substrate 43. A pair of sealing elements 48 is disposed between the transparent substrates 42 and 43 so as to provide a space 49 therebetween. The liquid crystal material 45 is filled in the space 49.

Figure 5:
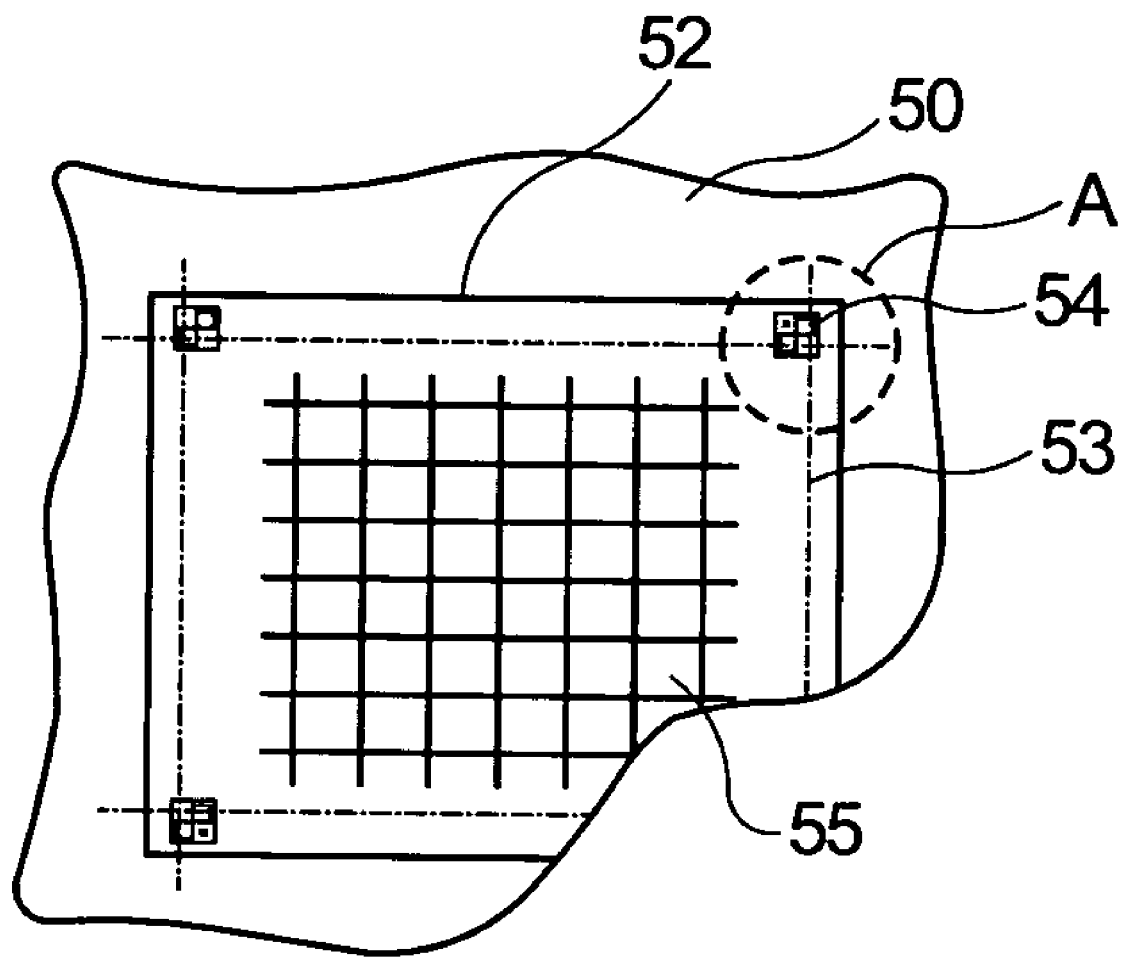
FIG. 5 is a schematic partial plane view of a first embodiment of the present invention.

FIG. 5 is a schematic partial plane view of a first embodiment of the present invention. An array substrate 52 is formed on a part of a large substrate 50. FIG. 5 shows the partial plane view of the large substrate 50 on which one array substrate 52 formed thereon. However, there is a plurality of array substrates 52 distant from each other disposed on the large substrate 50. In the first embodiment, a cutting line 53 is formed on each boundary of the array substrate 52, and one checkerboard mark 54 is formed on the intersection of two adjacent cutting lines 53. As mentioned-above, the array substrate 52 is a kind of transparent substrate (e.g. glass substrate) having a plurality of array units 55, such as the thin film transistors. Each of the array units 55 corresponds to a display area, i.e. a pixel area. The dimensions of the checkerboard mark 54 are as same as the cutting precision of the array substrate 52. The checkerboard marks 54 can be formed on the surface of the array substrate 52 having the array units 55, or the opposite surface of the array substrate 52 corresponding to the intersections of the adjacent cutting lines 53. When the checkerboard marks 54 are to be formed on the surface of the array substrate 52 having the array units 55, the checkerboard marks 54 can be formed during the process for manufacturing the array substrate 52. For example, the checkerboard marks 54 can be formed during the process for forming source/drain lines of the thin film transistors. The checkerboard mark 54 includes four square marks formed of a pair of first-square mark 541 in a diagonal relationship and a pair of second-square mark 542 in a diagonal relationship. It is preferable that the first-square mark 541 has a first pattern and the second-square mark 542 has a second pattern to distinguish from the first-square mark 541.

Figure 5A:
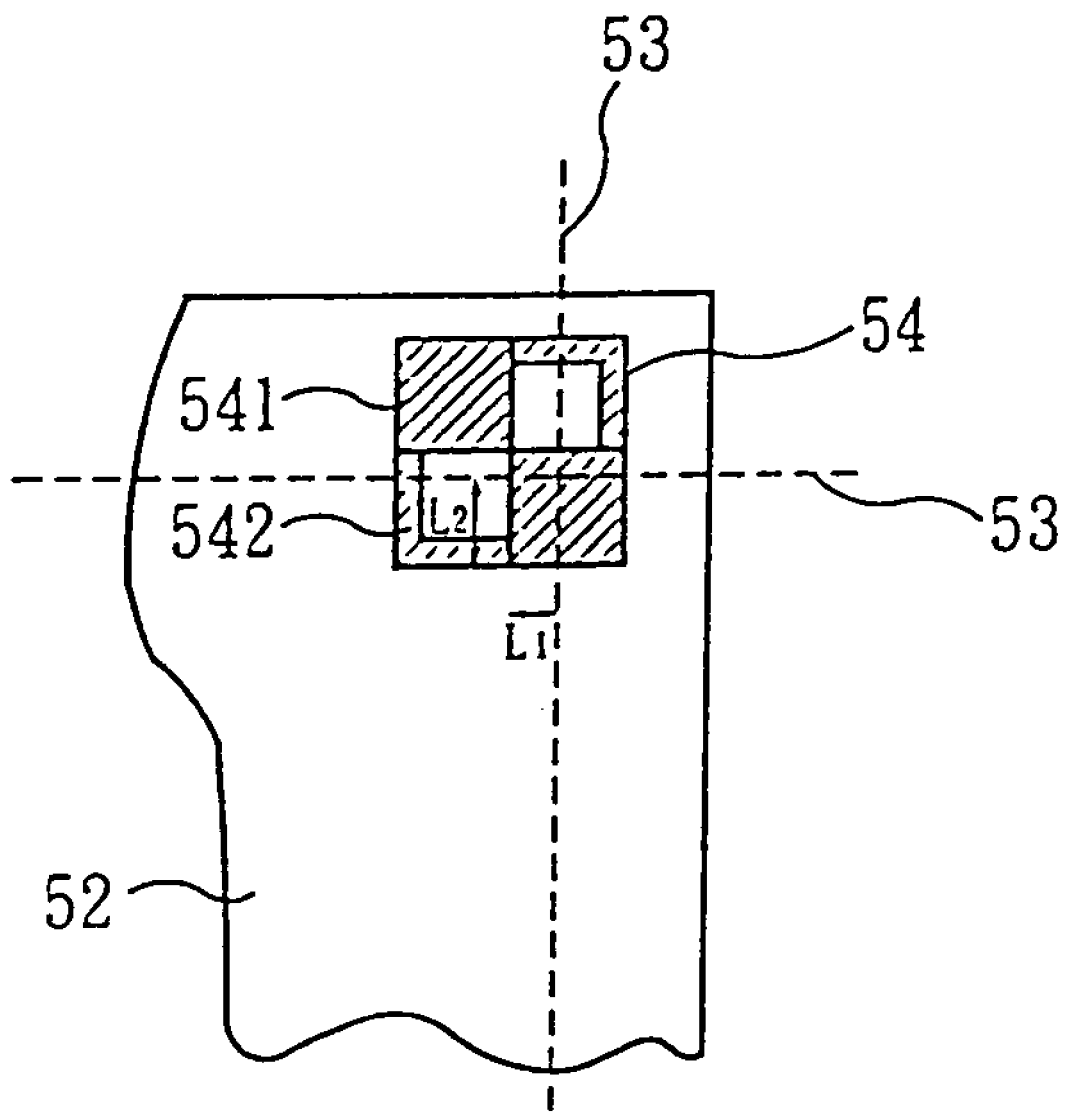
FIG. 5A is an enlarged partial plane view of FIG. 5.

FIG. 5A is an enlarged partial plane view of FIG. 5, after completing the cutting of the array substrates 52, the cutting precision of the array substrate 52 can be checked directly by visually inspecting the distance $L_1$ between the cutting line 53 and the first-square mark 541 and the distance $L_2$ between the cutting line 53 and the second-square mark 542. When the distances $L_1$ and $L_2$ are smaller than the dimensions of the first-square mark 541 and the second-square mark 542, the cutting precision of the array substrate 52 is permitted. Besides, when the residue of the first-square mark 541 or the second-square mark 542 is left on the array substrate 52, the cutting precision of the array substrate 52 is permitted.

Figure 6A:
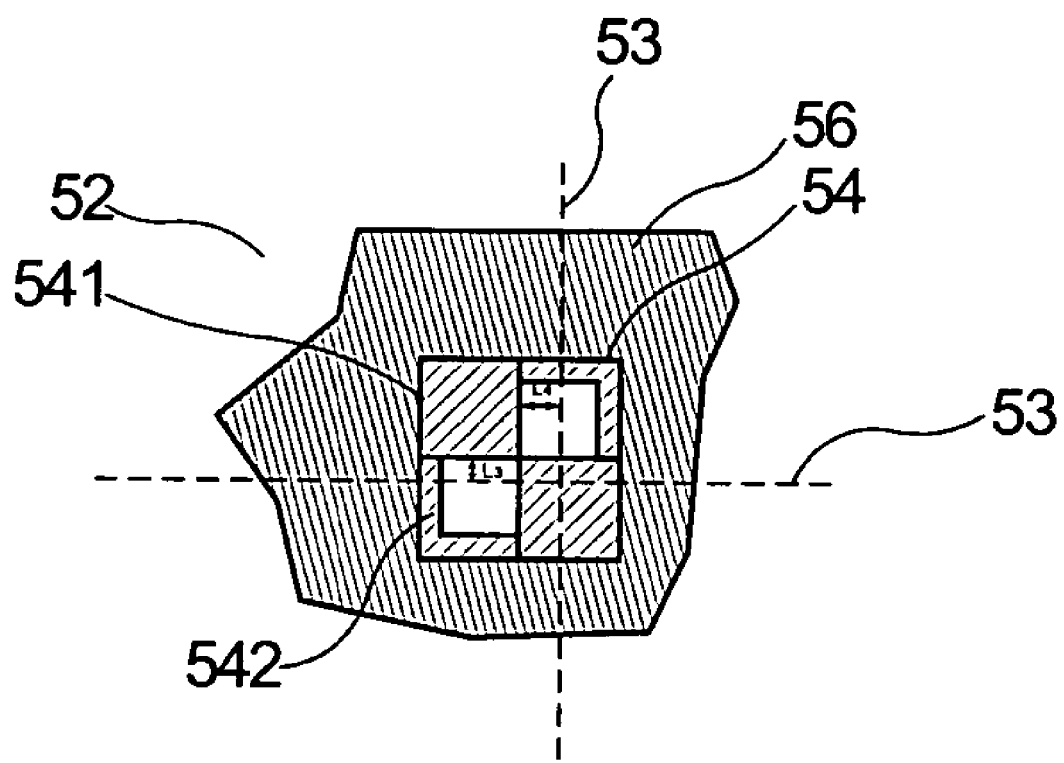
FIG. 6A is an enlarged partial plane view of a second embodiment of the present invention.

FIG. 6A is a schematic partial plane view of a second embodiment of the present invention. Referring to FIG. 5 again, the array substrate 52 is formed on the large substrate 50, and a pattern 56 is formed on the intersection of the two adjacent cutting lines 53. In the second embodiment, the checkerboard mark 54 is formed on the intersection of the two adjacent cutting lines 53 having the pattern 56 formed thereon. However, the checkerboard mark 54 is uncovered by the pattern 56. After the array substrate 52 is cut from the large substrate 50, the distance $L_3$ between the cutting line 53 and the first-square mark 541 and the distance $L_4$ between the cutting line 53 and the second-square mark 542 can be visually checked. The cutting precision of the array substrate 52 can be checked by visually inspecting whether the distances $L_3$ and $L_4$ are larger than the dimensions of the first-square mark 541 and the second-square mark 542. Besides, when observing the residue of the first-square mark 541 or the second-square mark 542 is left on the array substrate 52, the cutting precision of the array substrate 52 is permitted.

Figure 6B:
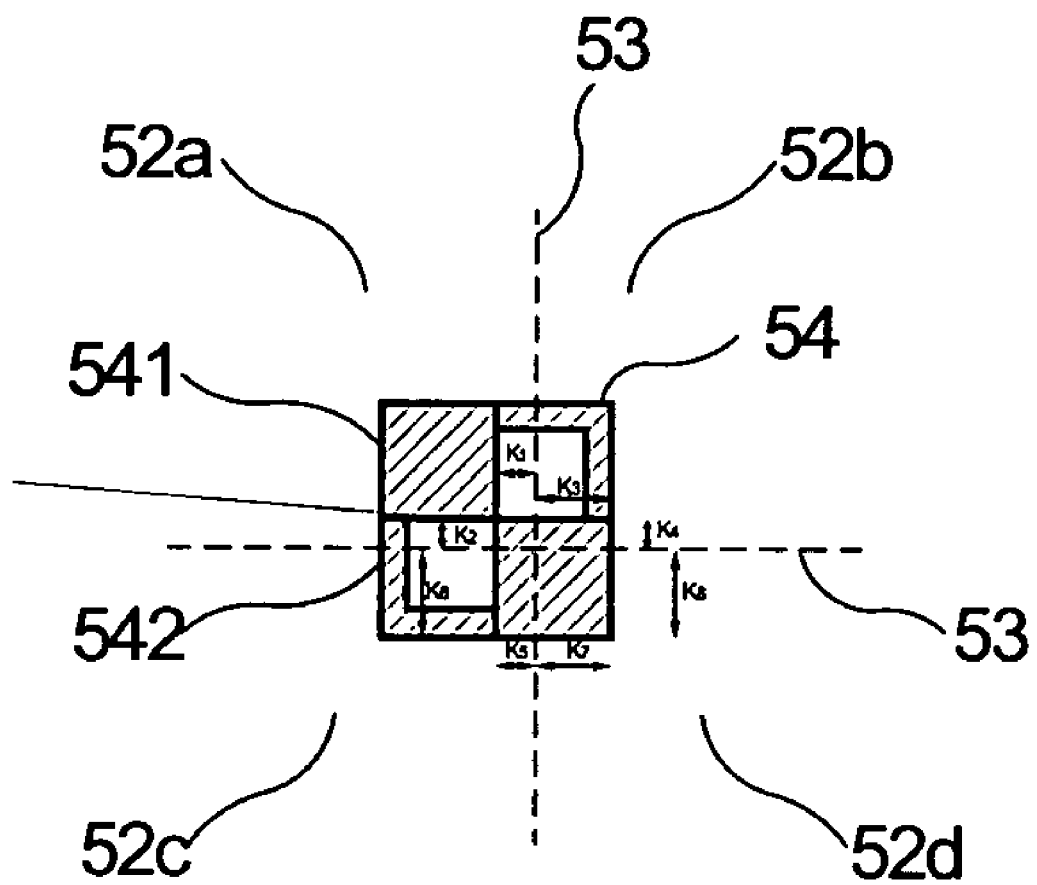
FIG. 6B is an enlarged partial plane view of a third embodiment of the present invention.

FIG. 6B is a schematic enlarged partial plane view of a third embodiment of the present invention. In the third embodiment, a plurality of array substrates 52 are disposed on the large substrate 50 and adjacent to each other. That is, the array substrates 52a, 52b, 52c and 52d are adjacent to each other on the large substrate 50. In the third embodiment, the checkerboard mark 54 is formed on the intersection of the two adjacent cutting lines 53. After the array substrates are cut from the large substrate 50, the cutting precision of the array substrates 52a, 52b, 52c and 52d can be checked by visually inspecting whether the distance $k_1$ between the array substrate 52a and the first-square mark 541, the distance $k_2$ between the array substrate 52a and the second-square mark 542, the distance $k_3$ between the array substrate 52b and the second-square mark 542, the distance $k_4$ between the array substrate 52b and the first-square mark 541, the distance $k_5$ between the array substrate 52c and the first-square mark 541, the distance $k_6$ between the array substrate 52c and the second-square mark 542, the distance $k_7$ between the array substrate 52d and the first-square mark 541, and the distance $k_8$ between the array substrate 52d and the first-square mark 541 is smaller than the dimensions of the first-square mark 541 or the second-square mark 542. Besides, when observing the residue of the first-square mark 541 or the second-square mark 542 is left on the array substrate 52a, 52b, 52c and 52d, the cutting precision of the array substrate 52a, 52b, 52c and 52d are also permitted.

Figure 7A:
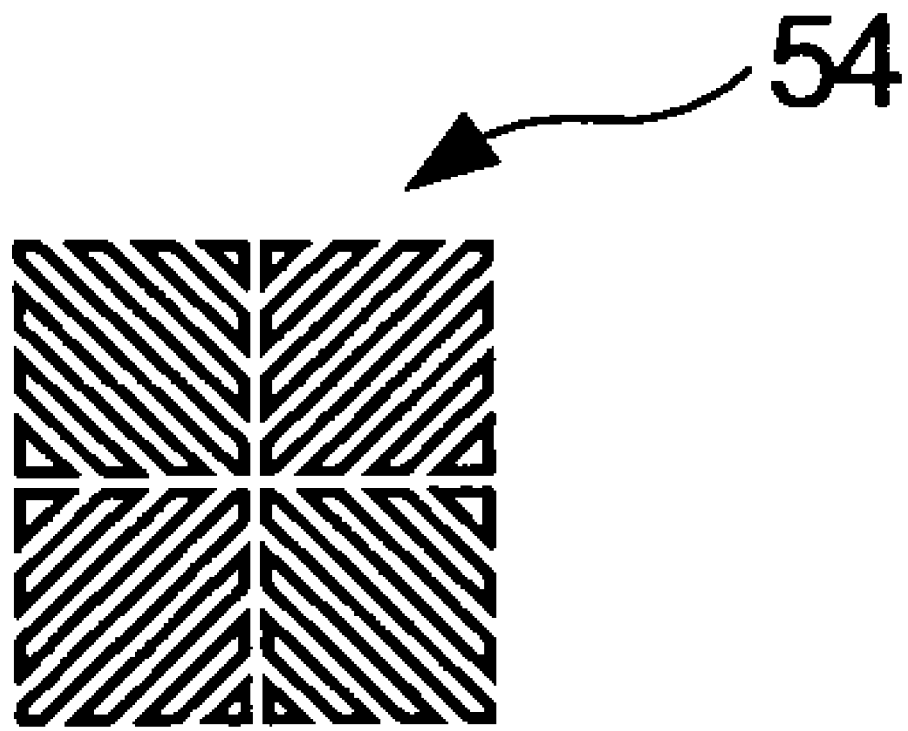
FIG. 7A to FIG. 7B is variances of the checkerboard mark of the present invention.
Figure 7B:
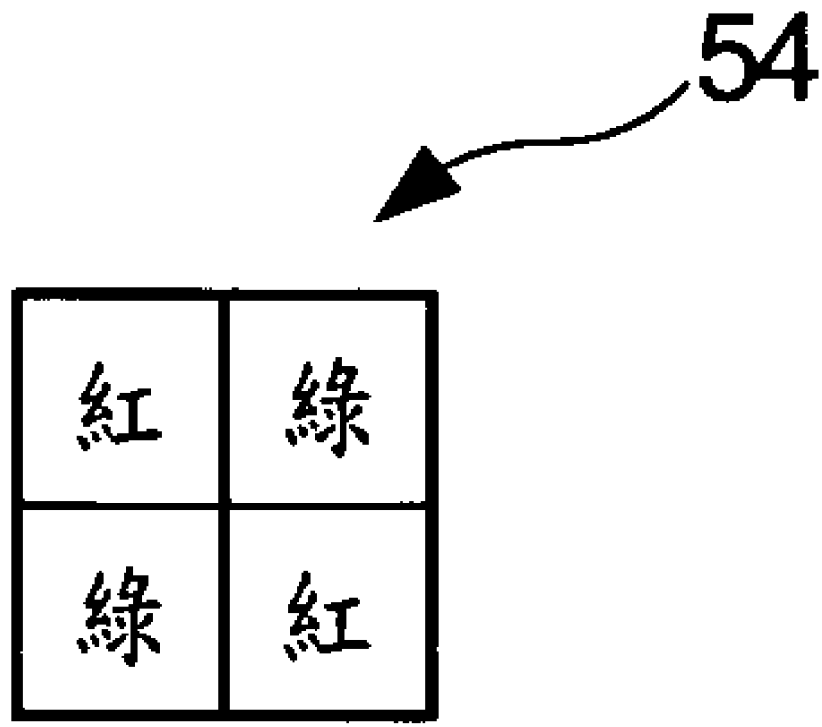

FIG. 7A is a variance of the checkerboard 54, which includes a first pattern and a second pattern. FIG. 7B is another variance, which includes a first color base (e.g. red) and a second color base (e.g. green).

In another aspect, the checkerboard mark 54 can be formed on the color filter substrates having not been cut from a large substrate. Referring to FIG. 4, the color filter substrate includes a plurality of color filter units. Each of the color filter units includes a plurality of red, green and blue sub-filters, and corresponds to a display area. Each boundary of the color filter unit has a cutting line, and each pair of the adjacent cutting lines are intersected so as to enclose the color filter unit. The checkerboard mark 54 is formed on the intersection of the two adjacent cutting lines of the color filter unit. The checkerboard marks 54 can be formed on the surface of the color filter substrate having the color filter units, or the opposite surface of the color filter substrate corresponding to the intersections of the adjacent cutting lines. When the checkerboard marks 54 are to be formed on the surface of the color filter substrate having the color filters, the checkerboard mark 54 can be formed during the process for manufacturing the color filter substrate. Besides, the designing of the checkerboard marks 54 is suitable for the conditions of the intersection of the adjacent cutting lines having a pattern or without a pattern, the panels disposed distant from each other on the large substrate, or the panels disposed adjacent with each other on the large substrate.

In still another aspect, the present invention provides a liquid crystal display panel with marks for checking cutting precision by visual inspection, referring to FIG. 4, which includes a first transparent substrate, a second transparent substrate, a liquid crystal material, a plurality of sealing elements and a plurality of electrodes. A plurality of array units and a plurality of first checkerboard marks are formed on the first transparent substrate. Each of the array units corresponds to a display area. Each boundary of the array unit has a cutting line, and the adjacent cutting lines are intersected to enclose the array unit. The first checkerboard mark is formed on the intersection of each pair of the adjacent cutting lines. The first checkerboard mark is a four-square mark including a pair of first-square marks in a diagonal relationship and a pair of second-square marks in a diagonal relationship. A plurality of color filter units are formed on the second transparent substrate. Each of the color filter units corresponds to one array unit. Similarly, each boundary of the color filter unit has a cutting line, and the adjacent cutting lines are intersected to enclose the color filter unit. A second checkerboard mark is formed on the intersection of the adjacent cutting lines. The second checkerboard mark is a four-square mark having a pair of third-square marks in a diagonal relationship and a pair of four-square marks in a diagonal relationship. The first transparent substrate is stacked over the second transparent substrate, and a space is contained therebetween. The liquid crystal material is filled in the space between each pair of the array unit and the color filter unit. The light transmissibility of the liquid crystal material is controlled by the voltage applied on. The sealing elements are disposed between each pair of the array unit and the color filter unit to seal the liquid crystal material. The electrodes are formed on the first transparent substrate and the second transparent substrate, respectively corresponding to each pair of the array unit and the color filter unit. The electrodes are used to apply the voltage on the liquid crystal material. When cutting the liquid crystal panel, at initial, the first transparent substrate is cut for some depth, and then, the second transparent substrate is cut. Thereafter, an external force is applied to the whole panel to break the panel units, each of which corresponding to a respective display area.

Figure 8A:
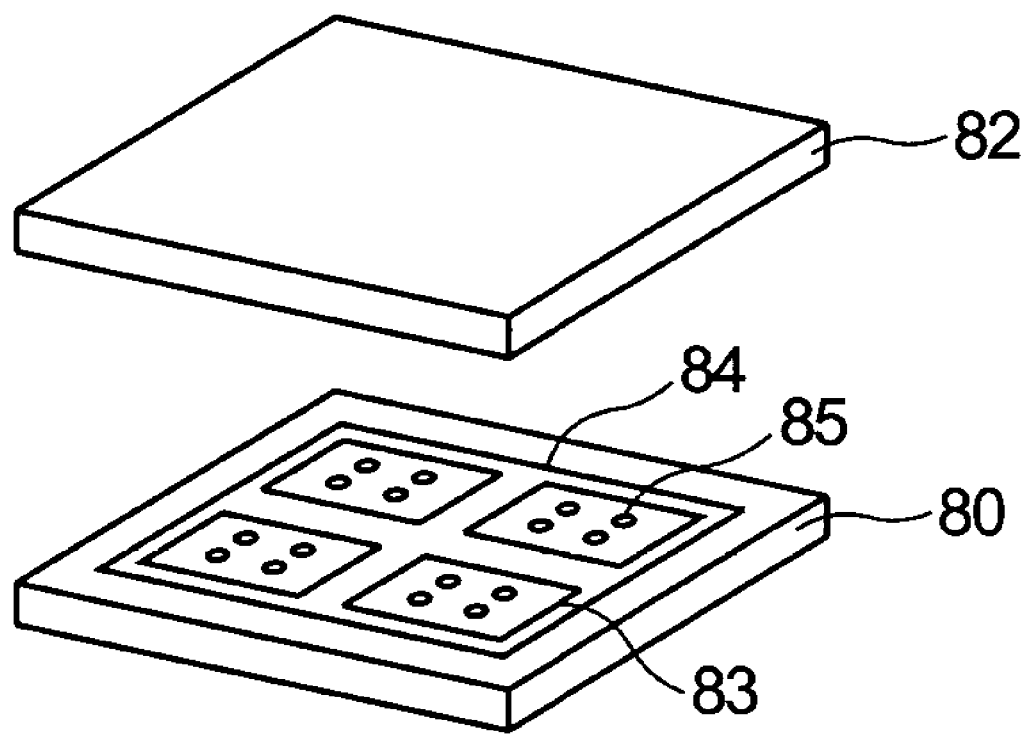
FIG. 8A is a schematic perspective view showing that the liquid crystal display panels are formed adjacent to each other on the large substrate by a liquid crystal dispensing method.
Figure 8B:
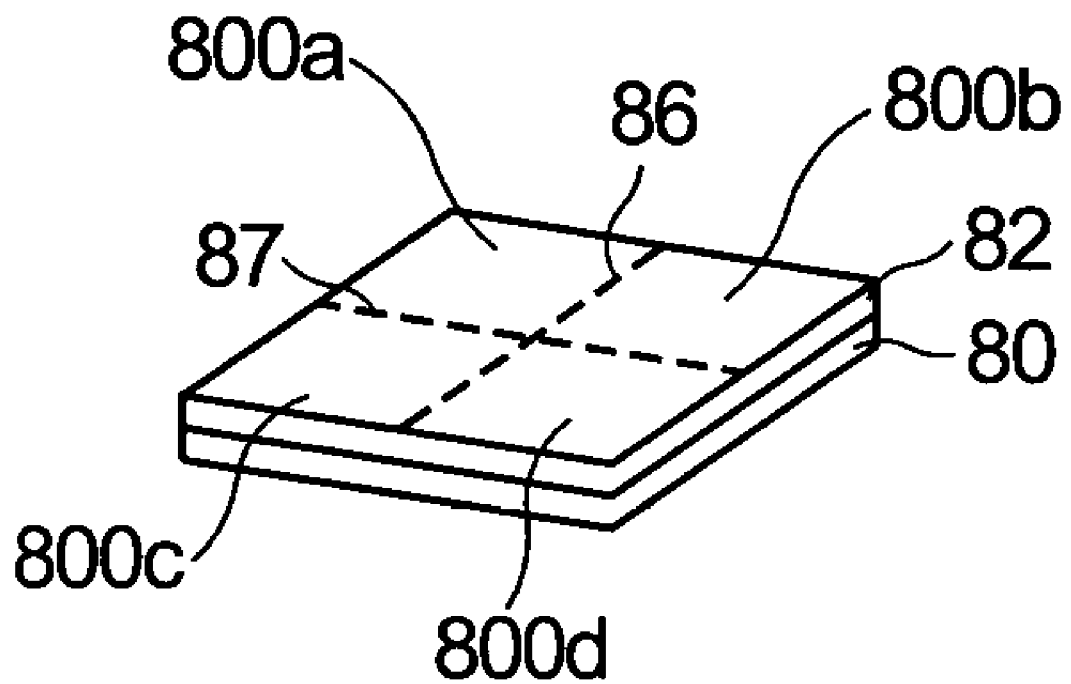
FIG. 8B is a schematic perspective view of the liquid crystal display panel that are formed by the liquid crystal dispensing method.
Figure 8C:
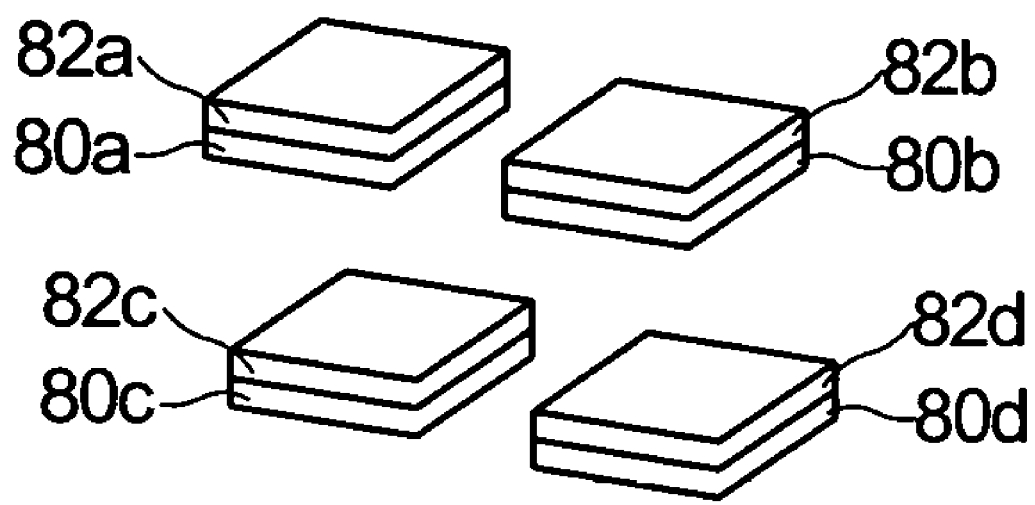
FIG. 8C is a schematic perspective view of several unit liquid crystal display panels cut from the liquid crystal display panel of FIG. 8B.

Besides, the array units can be disposed distant from each other on the first transparent substrate, or adjacent to each other on the first transparent substrate. FIG. 8A to FIG. 8C shows a process for manufacturing the liquid crystal display panels disposed adjacent to each other on a large substrate. FIG. 8A is a schematic perspective view showing that the liquid crystal display panels are formed adjacent to each other on the large substrate by a liquid crystal dispensing method. Referring to FIG. 8A, a plurality of array units (not shown) are formed on the bottom substrate 80, and each of the array units corresponds to a display area. A plurality of color filter units (not shown) are formed on the top transparent substrate 82, and each of the color filter units corresponds to one of the array units. A plurality of main sealants 83 and a dummy sealant 84 are formed on the bottom substrate 80. The liquid crystal 85 is dropped on the main sealants 83 to form liquid crystal layers. The main sealants 83 is used to prevent the liquid crystal from flowing out, and bond the bottom transparent substrate 80 and the top transparent substrate 82 to each other. The dummy sealant 84 is formed outside the surroundings of the main sealants 83 to protect the main sealants 83. In the liquid crystal dispensing method, the liquid crystal layers are formed on the bottom transparent substrate 80 before the top transparent substrate 82 and the bottom transparent substrate 80 are bonded together. FIG. 8B is a schematic perspective view of the liquid crystal display panel that are formed by the liquid crystal dispensing method. In FIG. 8B, the top transparent substrate 82 and the bottom transparent substrate 80 have cutting lines 86 and 87 intersected to each other. The cutting lines 86 and 87 divide the array units on the bottom transparent substrate 80 into several array units 800a, 800b, 800c and 800d. In the present invention, various checkerboard mark provided by the present invention can be formed on the intersection of the cutting lines 86 and 87 for visually inspecting the cutting precision of the unit liquid crystal display panel. When cutting the liquid crystal panel along the cutting lines 86 and 87, several unit liquid crystal display panels are obtained, as shown in FIG. 8B. Besides, the intersection of the cutting lines 86 and 87 can have a pattern exist or without a pattern. The first-square mark of the first checkerboard mark can have a first pattern and the second-square mark of the first checkerboard mark can have a second pattern. Alternately, the first-square mark of the first checkerboard mark can have a first color base and the second-square mark of the first checkerboard mark can have a second color base. Similarly, the third-square mark of the second checkerboard mark can have a third pattern and the fourth-square mark of the second checkerboard mark can have a fourth-square mark. Alternately, the third-square mark of the second checkerboard mark can have a third color base and the fourth-square mark of the second checkerboard mark can have a fourth color base.

The present invention provides a liquid crystal display (LCD) panel with marks for checking cutting precision by visual inspection. The checkerboard mark is formed on the intersection of the two adjacent cutting lines of the LCD panel. The checkerboard mark includes a pair of the first-square marks in a diagonal relationship and a pair of second-square marks in a diagonal relationship. When completing cutting of the LCD panel, the cutting precision of the LCD panel can be checked by visually inspecting the distance between the square mark and the cutting line or the residue of the checkerboard mark. As a consequence, the time for manufacturing the liquid crystal display panel can be shortened. Furthermore, the designing of the checkerboard mark is suitable for the conditions of the intersection of the two adjacent cutting lines having a pattern exist or without a pattern, the panels disposed distant from each other, and the panels disposed adjacent to each other.

The embodiments are only used to illustrate the present invention, not intended to limit the scope thereof. Many modifications of the embodiments can be made without departing from the spirit of the present invention.

What is claimed is:

1. An array substrate of a liquid crystal display panel, comprising:

a transparent substrate;

a plurality of array units formed on said transparent substrate, each of said array units corresponding to a display area, each boundary of said array unit having a cutting line, and each pair of said adjacent cutting lines intersecting with each other; and a plurality of checkerboard marks, each of said checkerboard marks formed on the intersection of each pair of said adjacent cutting lines, said checkerboard mark having a pair of first-square marks in a diagonal relationship and a pair of second-square marks in a diagonal relationship, wherein said first-square marks have a first color base and said second-square marks have a second color base.

2. The array substrate of claim 1, wherein said array units are disposed on said transparent substrate being distant from each other.

3. The array substrate of claim 1, wherein said array units are disposed on said transparent substrate being adjacent with each other.

4. The array substrate of claim 1, wherein a pattern is formed on the intersection of said adjacent cutting lines.

5. The array substrate of claim 1, wherein there is not any pattern formed on the intersection of said adjacent cutting lines.

6. The array substrate of claim 1, wherein said first-square mark has a first pattern and said second-square mark has a second pattern.

7. A color filter substrate of a liquid crystal display panel, comprising:
- a transparent substrate;
- a plurality of color filter units formed on said transparent substrate, each of said color filter units corresponding to a display area, and each boundary of said color filter unit having a cutting line, and each pair of said adjacent cutting lines intersecting with each other; and
- a plurality of checkerboard marks, each of said checkerboard marks formed on the intersection of each pair of said adjacent cutting lines, said checkerboard mark having a pair of first-square marks in a diagonal relationship and a pair of second-square marks in a diagonal relationship, wherein said first-square marks have a first color base and said second-square marks have a second color base.

8. The color filter substrate of claim 7, wherein said color filter units are disposed on said transparent substrate being distant from each other.

9. The color filter substrate of claim 7, wherein said color filter units are disposed on said transparent substrate being adjacent with each other.

10. The color filter substrate of claim 7, wherein a pattern is formed on the intersection of said adjacent cutting lines.

11. The color filter substrate of claim 7, wherein there is not any pattern formed on the intersection of said adjacent cutting lines.

12. The color filter substrate of claim 7, wherein said first-square mark has a first pattern and said second-square mark has a second pattern.

13. A liquid crystal display panel with marks for checking breaking accuracy by visual inspection, comprising:
- a first transparent substrate having a plurality of array units and a plurality of first checkerboard marks formed thereon, each of said array units corresponding to a display area, and each boundary of said array unit having a cutting line, and each pair of said adjacent cutting lines intersecting with each other, each of said first checkerboard marks formed on the intersection of said adjacent cutting lines, said first checkerboard mark having a pair of first-square marks in a diagonal relationship and a pair of second-square marks in a diagonal relationship, wherein said first-square marks have a first color base and said second-square marks have a second color base;
- a second transparent substrate having a plurality of color filter units and a plurality of second checkerboard marks formed thereon, each of said color filter unit corresponding to one said array unit, each boundary of said color filter unit having a cutting line, and each pair of said adjacent cutting lines intersecting with each other, each of said second checkerboard marks formed on the intersection of said adjacent cutting lines, said second checkerboard mark having a pair of third-square marks in a diagonal relationship and a pair of fourth-square marks in a diagonal relationship, said second transparent substrate being stacked over said first transparent substrate and a space contained therebetween;
- a liquid crystal material filled in the space between each pair of said array unit and said color filter unit, and a light traveling through said liquid crystal material capable of being controlled by an applied voltage; and
- a plurality of sealing elements disposed between said array units and said color filter units to seal said liquid crystal material.

14. The liquid crystal display panel of claim 13, wherein said array units are disposed on said first transparent substrate being distant from each other.

15. The liquid crystal display panel of claim 13, wherein said array units are disposed on said first transparent substrate being adjacent with each other.

16. The liquid crystal display panel of claim 13, wherein a pattern is formed on the intersection of said adjacent cutting lines of said first transparent substrate.

17. The liquid crystal display panel of claim 13, wherein there is not any pattern formed on the intersection of said adjacent cutting lines of said first transparent substrate.

18. The liquid crystal display panel of claim 13, wherein said first-square mark has a first pattern and said second-square mark has a second pattern.

* * * * *

UNITED STATES PATENT AND TRADEMARK OFFICE
CERTIFICATE OF CORRECTION

PATENT NO. : 7,304,713 B2 Page 1 of 1
APPLICATION NO. : 10/828296
DATED : December 4, 2007
INVENTOR(S) : Yi et al.

It is certified that error appears in the above-identified patent and that said Letters Patent is hereby corrected as shown below:

Title page, item [73] add

Assignee: AU Optronics Corporation, Hsin-Chu, Taiwan, R.O.C.

Signed and Sealed this

Twenty-eighth Day of September, 2010

David J. Kappos
*Director of the United States Patent and Trademark Office*